Nov. 23, 1965  H. LETAW, JR  3,219,826
TARGET TRACKING GUIDANCE SYSTEM WITH
FALSE SIGNAL DETECTING MEANS
Original Filed Feb. 27, 1959

INVENTOR
HARRY LETAW, JR.

BY
ATTORNEY

United States Patent Office 3,219,826
Patented Nov. 23, 1965

3,219,826
TARGET TRACKING GUIDANCE SYSTEM WITH
FALSE SIGNAL DETECTING MEANS
Harry Letaw, Jr., Severna Park, Md., assignor to Raytheon Company, Lexington, Mass., a corporation of Delaware
Continuation of application Ser. No. 796,127, Feb. 27, 1959. This application Oct. 7, 1963, Ser. No. 315,121
6 Claims. (Cl. 250—83.3)

This is a continuation of copending United States Patent application No. 796,127, filed on February 27, 1959, and now abandoned.

This invention relates to guidance and/or detection systems and more particularly to means for preventing such systems from locking on sources of energy having a spectral distribution in two bands which differ from a predetermined ratio.

Present-day infrared guidance and/or detection systems are comprised of an optical collector and a filter adapted to supply radiation in the infrared spectrum to a detector sensitive to infrared radiations of the desired wavelength. Additional means are provided to convert the continuous optical or infrared image of a target to a discontinuous image whereby an electrical output signal provided by the detector, such as, for example, a photo cell is either amplitude or frequency modulated. This signal is then fed to the control system which effects the desired control of the missile or the like carrying the complete system. In order to acquire a target the optical collector is usually rotated about a fixed axis during travel of the missile, and upon acquisition of a target the signal derived therefrom will cause, for example, searching functions to cease and well-known homing functions to begin. Obviously, if a target is lost the searching functions may be reactuated and the above described process repeated. All this, including the means necessary to carry out these functions are well known in the art. Of course, infrared systems and particularly present-day infrared guidance systems are subject to countermeasures. The most common method to countermeasure such a system is for the intended target to drop flares or provide a point source of energy constituting a countermeasure capable of emitting infrared radiations. The countermeasure is launched such that it is disposed at least temporarily between the intended target and the attacking missile and/or travels toward and within the tracking field of the attacking missile. At some point in time shortly after the countermeasure has been launched, the level of infrared radiation from the countermeasure or false target as seen by the missile guidance system will be equal to or greater than that of the target; hence, the missile will lock on the countermeasure and the intended target will escape. Similarly, if a target is destroyed by a previous missile, a second missile will lock on the destroyed target or burning parts thereof just as readily as on a countermeasure and with the same undesirable results. This latter effect has heretofore seriously limited the effectiveness of firing in salvo missiles having infrared guidance systems.

Another serious limitation of present-day missiles is that the arming of the missile is effected by means that are actuated, generally by timing means, after the lapse of a selectable length of time after launching of the missile. Although a fixed delay may be built into the arming means, which delay is satisfactory for all targets located beyond a specific distance from the launching vehicle or body at the time of launching, this is entirely unsatisfactory for close or very close targets, or alternately, if the delay time is selectable, the desired delay must be selected manually before the missile is launched. Such an arrangement may result in the missile not being armed in time, an improper delay being selected and, most important, the requirement that the arming time of each missile be set manually prior to launching. The presence of these limitations seriously limits the dependability and versatility of the missile.

For countermeasure purposes, at present a high energy burst of infrared radiation may be satisfactorily obtained only by means that also provides simultaneously a burst of higher energy radiation, i.e., visible light. The present invention utilizes this effect to overcome the aforementioned and other disadvantages for infrared systems by providing a false alarm detector circuit comprising means for detecting the presence of visible light above a chosen threshold effective to sterilize the control system or unlock the control function of the control system during the presence of such light or for a predetermined length of time.

Briefly, this is accomplished by the provision of an optical system sensitive to visible light of a limited bandwidth, means to convert this optical signal to an electrical signal, gating means operative when the electrical signal has a magnitude greater than a predetermined amount and an anti-coincidence circuit for receiving the signal from the aforementioned gate and the infrared detector circuit that forms an integral part of present-day guidance systems. For anti-coincidence, or the normal case, where no signal is supplied to the anti-coincidence circuit from the false alarm detector, i.e., a countermeasure is not present, the anti-coincidence circuit supplies the signal from the infrared detector circuit directly to the control system. For coincidence or the case where a countermeasure is present, the false alarm detector supplies a signal to the anti-coincidence circuit which, inter alia, effects sterilization of the control system to prevent the missile from locking on a countermeasure. When the signal from the false alarm detector disappears normal control functions are re-established to allow, for example, the missile to relock on the target.

An improved guidance system and false alarm detector may be obtained by providing means between the anti-coincidence circuit and the control system for substantially continuously computing impact time and supplying to the control system, when coincidence exists, a signal effective to maintain the missile on its original heading or a predetermined course. The impact time or the time that must elapse at any time after a missile has been launched and before the missile will strike a target on which it has locked is dependent upon reproducible and well-known factors. As will be more thoroughly pointed out hereinafter, impact time may be computed very simply from the current, voltage or other transducer output of the detector forming a part of present-day systems.

The means for computing impact time may be adapted to make successive estimates of the impact time and be provided with a low capacity memory which stores, for example, the last or even the last ten values of impact time. For the infrared case, if the target launches an infrared countermeasure device, this device would be expected to be a bright flare or the like as described hereinbefore. As the flare detonates, the intensity received by the system will increase sharply. This intensity may, for example, then be compared with the best extrapolation of the last ten values of impact time stored by the aforementioned memory means and if the intensity is unreasonable with that which would be expected, the output of the detector means may be interrupted and the value of the extrapolate intensity stored to cause a suitable signal to be supplied to the guidance system for effecting desired control of the missile. Except in a trivially improbable case, the countermeasure will remain in the detector-target line of sight only a brief time, hence, control function of the system may be undertaken again after the countermeasure disappears or after target reacquisition. Further, the system may be instructed to hunt after a time interval though to be reasonable if the target is lost.

Impact predicting means of the type described herein have several applications. For example, it is ideally suited for arming a warhead. If no target is ever acquired the warhead will never be armed (if desired) and when a target is acquired, the warhead may be caused to be automatically armed at substantially any time after the missile is launched. It is also useful as a proximity fuse since predicted impact time is predicted more accurately as the time grows shorter. Further, in conjunction with a telemetering system, it may be used as a miss-distance indicator by building in a non-zero impact time as a minimum condition on the computer to cause the missile to miss by a predetermined distance or in a particular manner targets which it is not desired to strike as, for example, in testing or experiments.

Another important use is the application of the invention to the measurement and detection of underwater signals. For example, a submarine with listening gear can obtain a strong target signal even though at a great distance from the source. In such a case the signal has been ducted just as light is in a "light pipe." The submarine can proceed to attempt to close on the source without ever getting to it. If the submarine measures $d \ln I/dt$ (defined hereinafter) using is sound gear for a period of time during which the submarine is moving and then measures it while dead in the water, the situation can immediately be determined. If impact time is relatively constant in both cases, then the target signal is being ducted over a great distance. If impact time changes between the two cases, then one can estimate the speed of the target relative to the course and speed of the submarine. This can eliminate fruitless chases or wasted torpedos. The invention is also applicable to sonic homing torpedoes and noise generators launched from a submarine under attack and surface ship-submarine encounters.

Other objects and many of the attendant advantages of the invention will be greatly appreciated as the same becomes better understood by reference to the following detailed description when considered in connection with the accompanying drawing wherein.

Figure 1:
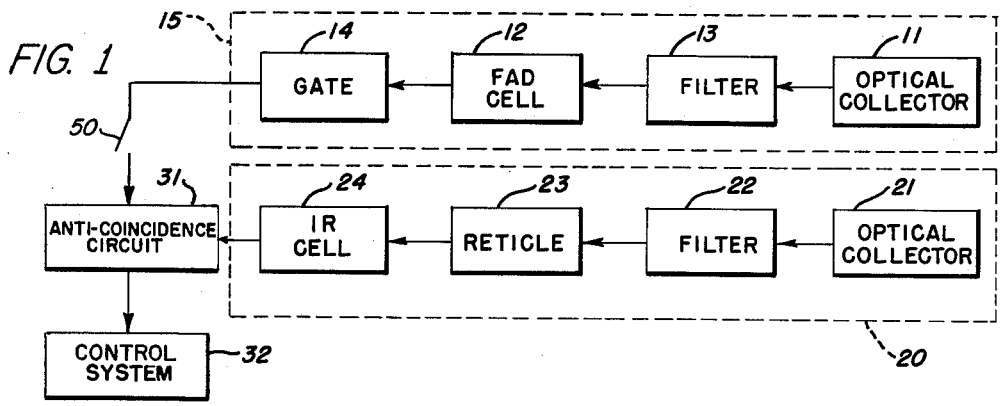
FIG. 1 is a schematic block diagram of the invention.

Referring now to FIG. 1, there is shown by way of example an optical collector 11 for supplying an image to a photocell 12 having a desired sensitivity to visible radiation. The image may be, for example, that of space disposed forwardly of a missile and is passed through a filter 13, such as for example, window glass having the characteristic of cutting off or blocking radiation in the infrared spectrum. A suitable false alarm detector (FAD) photocell 12 such as, for example, a cadmium or lead sulfide cell, provides an electrical signal having a magnitude proportional to the level of radiation it receives. The output signal of the photocell is passed through a gating circuit 14 adapted to pass only those signals having a magnitude greater than a predetermined amount. Since it is not desirable that the false alarm detector circuit 15 be actuated by natural sources of visible light, the gate 14 functions to block those signals originating from usual or conventional background sources. A conventional infrared detector circuit 20 is shown by way of example in FIG. 1 as comprised of an optical collector 21, a filter 22 for blocking all radiations except those in the infrared spectrum, a reticle 23 and an infrared photocell 24 such as, for example, a gold doped germanium cell.

The schematic block diagram of the infrared detector circuit 20 is shown by way of example only, and the specific components thereof are not important to the present invention. Any suitable detector for providing an output signal from the infrared cell 24 containing target position information with respect to the guidance system can be used. The output signals from the false alarm detector 15 and the infrared detector 20 are simultaneously supplied to an anti-coincidence circuit 31 of the type, for example, described by J. Fisher and J. Marshall, Review of Scientific Instruments, vol. 23, page 417, 1952.

Although two separate optical collectors 11–21 have been shown, it is to be noted that a single optical collector may be used in combination with means well known in the art to supply separate images to filters 13–22 from an image received by the single optical collector. Further, the filters may form an integral part of the optical collectors or be separate therefrom. The filter 13 for the false alarm detector may, for example, be window glass or a material having the characteristic of passing visible radiation but rejecting infrared radiations.

Assuming that a countermeasure in the form of a flare having suitable infrared radiation, and which must have substantial or even greater visible radiation, has been launched between an intended target and an attacking missile carrying an infrared guidance system incorporating the present invention, and further assuming that the countermeasure has been detected by the missile as would be the case, infrared radiation from both the target and the countermeasure will be detected and processed in the usual manner by the infrared detector to provide tracking information to the guidance system. The false alarm detector 15, being sensitive to visible radiation as and for the reasons described hereinabove, will produce an output signal to the anti-coincidence circuit 31. Upon receipt by the anti-coincidence circuit 31 of the signal from the false alarm detector 15, coincidence with the signal from the infrared detector 20 exists and the anti-coincidence circuit 31 will be actuated. Actuation of the anti-coincidence circuit 31 blocks the output signal from the infrared detector 20 in which the signal resulting from the presence of the countermeasure predominates over the signal resulting from the intended target due to the greater intensity of infrared radiation from the countermeasure over that of the target and the greater proximity of the countermeasure to the missile. Normally such a situation would result in the missile locking on the countermeasure. However, when the signal from the false alarm detector 15 disappears, which is to say the countermeasure has disappeared from the tracking field of the missile, the anti-coincidence circuit 31 returns to its normal condition and allows all signals from the infrared detector 20 to be applied to the control system 32 which causes the missile to relock on the intended target.

Figure 2:
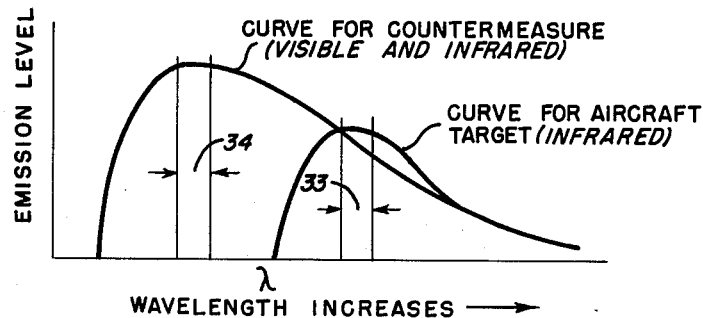
FIG. 2 is a graphic illustration showing the relation of curves of emission vs. wavelength for an airplane engine or the like and a countermeasure and which also shows the bandwidth of radiation passed by the false alarm detector and the infrared detector.

FIG. 2 is a graphic illustration showing by way of example the relation of curves of emission of an airplane engine and a present-day countermeasure of the flare type. As may be clearly seen by reference to FIG. 2, the emission from an airplane engine is substantially within the infrared region, the level of which increases sharply, levels off and then decreases slowly. The emission from a countermeasure however has its maximum level in the visible region while the level thereof in the infrared region is comparable to that of the desired target or airplane engine, for example.

The bandwidth 33 of radiation received by the infrared photocell 24 lies in the infrared region as shown in FIG. 2, while the bandwidth 34 of radiation received by the photocell 12 lies in the visible region. The longest wavelength of energy in bandwidth 34 is and should be such that it is less than the shortest reasonably detectable wavelength of energy normally emitted by a desired target.

Figure 3:
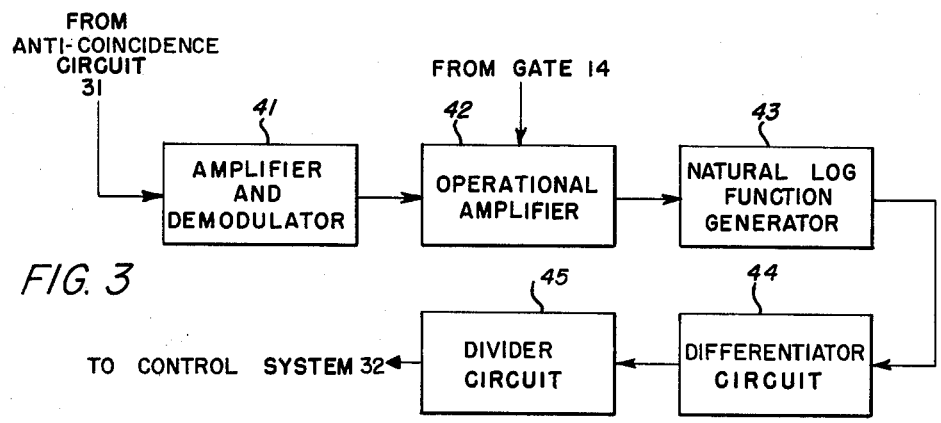
FIG. 3 is a schematic block diagram of a modification of the invention.

The basis for determining the respective functions of the components comprising a suitable impact predicator, one form of which is shown by way of example in block form in FIG. 3, may be seen from the following discussion. The intensity of infrared radiation incident upon a detector such as, for example, detector circuit 20 may be represented by the expression $$I = \frac{I_o}{R^2}$$

where I is the intensity of radiation falling on the detector, R is the detector-source separation distance, $I_o$ is a constant which includes the source intensity and various well-known geometrical factors.

The time derivative of I is $$\frac{d \ln I}{dt} = \frac{dI}{I dt} = -\left(\frac{2}{R}\right)\left(\frac{dR}{dt}\right)$$

Since $dR/dt$ is the rate of closure of the detector on the source, it may be seen that $$\frac{d \ln I}{dt} = -\frac{2V_c}{R} = \frac{2}{\lambda_c}$$

where $V_c$ is the closing velocity and $\lambda_c$ is the predicted time elapsing until impact. The minus sign indicates that time until impact decreases as $$\frac{d \ln I}{dt}$$

increases. As pointed out hereinbefore, the various values of $\lambda_c$ can be computed from the current, voltage or other transducer output of the detector, the accuracy of $\lambda_c$ being substantially dependent upon the noise level of the detector. It is realized that the above determination of $\lambda_c$ is not entirely accurate because it does not include the effect of atmospheric attenuation of radiation. For the case of a constant absorption coefficient $\alpha$ of the atmosphere for radiation at the wavelengths here being considered, $$I = \left(\frac{I_o}{R^2}\right) \exp(-\alpha R)$$

and $$\frac{d \ln I}{dt} = \left[-\left(\frac{2}{R}\right) - \alpha\right]\frac{dR}{dt}$$

The quantity $\alpha$ has the dimension of (length)$^{-1}$ and for the atmosphere at useful wavelengths at sea level, $\alpha$ is of the order of magnitude of tens to hundreds of reciprocal miles. In view of this it is evident that $1/\alpha$ is very small and will introduce but little error, particularly as the detector approaches the target since $\alpha$ is of decreasing importance at this range.

For the more general case the absorption coefficient is a variable function of the detector-source distance and may be represented as $\alpha(R)$. Such is the case because infrared absorption varies with altitude, water content, $CO_2$ content of the atmosphere and the like. For this case $$\frac{d \ln I}{dt} = \left\{-\left(\frac{2}{R}\right) - R\left[\frac{d\alpha(R)}{dR}\right] - \alpha(R)\right\}\left(\frac{dR}{dt}\right)$$

Hereinabove it was pointed out at $\alpha(R)$ may be neglected. Further, in general $$\frac{d\alpha(R)}{dR}$$

is small during times of greatest utility and, as closure occurs, R decreases.

Having now derived the function of $\lambda_c$, specific means for electrically computing and reproducing $\lambda_c$ will be described with particular reference to FIG. 3. The impact predicator as shown in FIG. 3 is most advantageously interposed between the anti-coincidence circuit 31 and the control system 32 and may be comprised of an amplifier and demodulator 41, an operational amplifier 42, a natural log function generator 43, a differentiator circuit 44 and a divider circuit 45. The output signal of the anti-coincidence circuit 31, or a portion thereof, is supplied to the amplifier and demodulator 41 wherein the output signal of the anti-coincidence circuit 31, which is representative of intensity, is detected and amplified to a suitable value. The output signal of the amplifier and demodulator 41, which varies about an increasing mean value proportional to intensity, is supplied to a conventional operational amplifier 42 which may contain, for example, a low pass filter for smoothing the output signal of the amplifier and demodulator 41 and suitable feedback means, comprising the memory, actuated by a signal from the gate 14. Actuation of the operational amplifier by gate 14 provides an output signal therefrom that changes at substantially the same rate that it was changing just prior to or at the instant of actuation of gate 14, which is to say detection of a countermeasure. The output signal of the operational amplifier 42 is supplied to a function generator 43 adapted to provide an output signal that is substantially proportional to the natural log of its input signal. The output signal of function generator 43 is in turn supplied to a differentiator circuit 44 having an output signal proportional to the time derivative of its input signal. The output signal of the differentiator circuit 44 is supplied to a divider circuit 45 which, for example, may be a servo system or a biased diode circuit which provides an output signal proportional to $\lambda_c$. This output signal from the divider circuit 45 may then be supplied directly to the control system 32 as and for the purposes described hereinbefore.

It may now be apparent that the components comprising the impact predicator computes the proper function of $\lambda_c$ from the output signal of the anti-coincidence circuit and upon actuation of the memory portion of the operational amplifier 42, i.e., upon detection of a countermeasure, continues to compute $\lambda_c$ with a substantial degree of accuracy and which may be used, for example, to control the direction of travel of the missile, detonation of the warhead or to control specific functions of the control guidance system.

Figure 4:
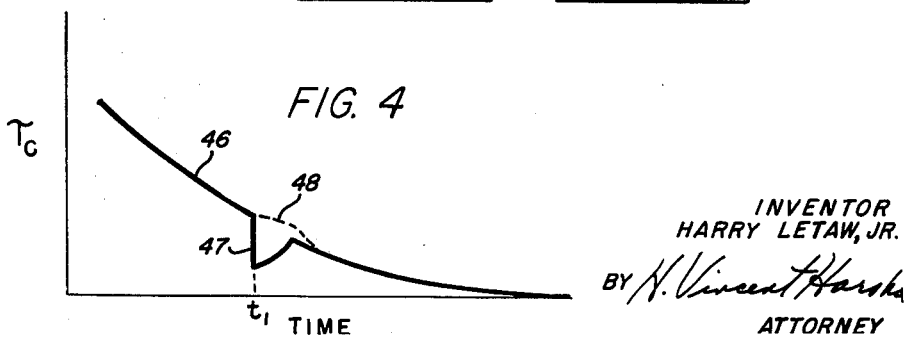
FIG. 4 is a graphic illustration of the relation of a typical curve of impact time vs. time.

FIG. 4 shows the relation of a typical curve 46 of $\lambda_c$ vs. time and the uncompensated and compensated effect of a countermeasure at time $t_1$. In the absence of impact predicator means described herein, the presence of a countermeasure at time $t_1$ would cause a sudden decrease 47 in impact time based on intensity by reason of a sudden decrease of intensity. However, actuation of gate 14 blocks the output of the detector 20 thereby eliminating the decrease 47 and simultaneously actuates the operational amplifier 42 to provide a signal 48 that closely approximates what $\lambda_c$ should be during the relatively short time that the countermeasure is effective.

The function of the false alarm detector may be interrupted by a switch 50 after a chosen period of time even though coincidence persists. This may be necessary because a substantial and persistent change in radiation from the desired target itself may have occurred. Such a change could arise from, for example, the activation of an afterburner on a turbojet engine or the injection of a high energy fuel to permit evasion of the expected missile attack. Furthermore, the countermeasure-anticountermeasure game could be played by a well informed opponent igniting a flare attached to his vehicle to cause decoupling of the missile control function from radiations arising from his vehicle. The interruption of the coincidence signal, as well as erasure of the memory, after a predetermined time deemed reasonable for flares or wreckage to fall out of the beamwidth of the detector optical system constitutes a measure to counter such events or tactics. The predetermined time, mentioned above, as can be determined from the geometry of the interception, must be a function of the time remaining until closure being shorter, the shorter the time remaining until closure.

It is to be understood that the present invention is not limited to systems utilizing infrared radiations. The invention is equally applicable to electromagnetic energy, sonic energy, gamma rays, electrons, nuclei and the like where a specific spectral distribution of a desired target is utilized to detect the presence and/or location of a target.

The principle of operation and means for efficiently and effectively carrying this principle into effect having been described herein, other arrangements and combinations will readily suggest themselves to persons skilled in the art such as, for example, schemes for converting energy in the visible spectrum to an electrical signal and for varying the threshold at which the false alarm detector will be actuated. The output signal from gate 14, may, in addition to sterilizing the control system, be made to perform an additional function, for example, of arresting search functions of the optical collector 21 where it is rotated during search. Further, means other than a anti-coincidence circuit may be utilized to obtain the same end result. Still further, if the speed of the missile or other vehicle carrying the detector is measured in conventional manner, then range can be approximated from time remaining until closure. This approximation becomes more nearly exact the higher the velocity of the missile relative to the target, and is reasonably exact for the useful case in which the missile has a substantial speed advantage to permit interception of high performance aircraft. These and other equivalent arrangements will not depart from the scope of the invention.

What is claimed is:

1. In a guidance system, a counter-countermeasures system for inhibiting an electrical signal representative of infrared radiation in the presence of visible light and infrared radiation emitted from a common source in order to confuse said guidance system, said counter-countermeasures system comprised of means for receiving infrared radiation, means for converting said infrared radiation to a first electrical signal, means for receiving visible radiation and rejecting infrared radiation, means for converting said visible radiation to a second electrical signal, means for receiving said first and second electrical signals, said last named means being operative to pass said first electrical signal to said guidance system only when said second electrical signal is not present.

2. In a target tracking guidance system, a false alarm system for preventing said guidance system from tracking a decoy emitting radiation in a first frequency band while said guidance system is tracking a target emitting radiation in a second frequency band, said false alarm system comprised of means for receiving radiation emitted in said first frequency band and rejecting radiation emitted in said second frequency band, means for converting said received radiation in said first frequency band to a first electrical signal, means for passing said first electrical signal when it has a magnitude greater than a specified amount, means for receiving radiation in a second frequency band and rejecting radiation in said first frequency band, means for converting said received radiation in said second frequency band to a second electrical signal, and means for preventing said second electrical signal from being utilized by said guidance system if said first electrical signal is greater in magnitude than said specified amount.

3. In a guidance system utilizing an infrared detector circuit having an electrical output signal containing target information with respect to the guidance system for actuating the guidance system, means for detecting the presence of a false target having a substantial amount of radiation in both the visible and infrared spectrums comprising: optical means for collecting and transmitting visible radiation in a specified bandwidth and rejecting infrared radiation; means including a photocell for receiving and converting visible radiation transmitted by said optical means to an electrical signal having a magnitude proportional to the level of said transmitted radiation; a gating circuit for receiving and passing said electrical signal when it has a magnitude greater than a specified amount; and circuit means including an anti-coincidence circuit connected between said gate and said infrared detector circuit and said guidance system for receiving said electrical signal and said infrared detector output signal to said guidance system only when said other electrical signal is not present whereby when a said false target is present the guidance system is insensitive to infrared radiation therefrom.

4. In a guidance system, a system for inhibiting an electrical signal representative of infrared radiation in the presence of simultaneously emitted countermeasures radiation from a decoy, said countermeasures radiation including radiation in both the infrared and visible frequency bands, said system for inhibiting comprised of first optical means for receiving and transmitting infrared radiation, means for receiving and converting said infrared radiation to a first electrical signal, second optical means for receiving visible radiation and rejecting infrared radiation, means for converting said visible radiation to a second electrical signal having a magnitude proportional to the level of said visible radiation, means for passing said second electrical signal only when it has a level which is greater in magnitude than a level which is related to an expected amount of background visible radiation, means for receiving said first and second electrical signals, said last means transmitting said first electrical signal only when said second electrical signal is not passed.

5. In a guidance system utilizing an infrared detector circuit having an electrical output signal containing target information with respect to the guidance system, means for detecting the presence of a false target having a substantial amount of radiation in the visible spectrum comprising: optical means for receiving visible radiation and rejecting infrared radiation; means including a photocell for receiving and converting visible radiation received by said optical means to an electrical signal having a magnitude proportional to the level of said visible radiation; a gating circuit for receiving and passing said electrical signal when it has a magnitude greater than a specified amount; circuit means including an anti-coincidence circuit connected between said gate and said infrared detector circuit and said guidance system for receiving said electrical signal and said infrared detector output signal, said means being operative to supply said infrared detector output signal to said guidance system only when said other electrical signal is not present; and means for receiving at least a portion of said anti-coincidence circuit output signal and supplying to said guidance system a signal proportional to impact time, said means being connected between said anti-coincidence circuit, said gate and said guidance system and actuated by said gate to supply said signal proportional to impact time when said infrared detector output signal is blocked by said anti-coincidence circuit.

6. Means for detecting the presence of an object having a spectral distribution in first and second separate and distinct bands which differ from a specific ratio for a guidance system utilizing detector circuit means actuated by energy in said second band and having a first output signal containing target position information with respect to said system comprising: first means for receiving energy in said first band but not in said second band; second means for receiving and converting energy received by said first means to a second electrical output signal; third means for receiving said first and second output signals operative to pass said first output signal only when said second output signal is not present; and fourth means connected between the output of said third means and said system for supplying a signal proportional to impact time, said fourth means being actuated by said second output signal to supply said signal proportional to impact time when said first signal is blocked by said third means whereby said system is rendered insensitive to objects having a spectral distribution in both said first and second bands and is actuated by objects having a spectral distribution substantially only in said second band.

References Cited by the Examiner

UNITED STATES PATENTS

| | | | |
|---|---|---|---|
| 2,794,926 | 6/1957 | Watts et al. | 250—83.3 |
| 2,825,021 | 2/1958 | Friend | 250—203 X |
| 2,906,885 | 10/1959 | Orthuber | 250—222 |
| 2,993,121 | 7/1961 | Esher | 250—83.3 |

RALPH G. NILSON, *Primary Examiner.*